(12) United States Patent
Sasaki

(10) Patent No.: US 12,267,407 B2
(45) Date of Patent: Apr. 1, 2025

(54) COMMUNICATION APPARATUS, SERVER SYSTEM, CONTROL METHOD FOR COMMUNICATION APPARATUS, AND STORAGE MEDIUM

(71) Applicant: CANON KABUSHIKI KAISHA, Tokyo (JP)

(72) Inventor: Akitomo Sasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 440 days.

(21) Appl. No.: 17/814,409

(22) Filed: Jul. 22, 2022

(65) Prior Publication Data

US 2023/0034311 A1 Feb. 2, 2023

(30) Foreign Application Priority Data

Jul. 29, 2021 (JP) .................. 2021-124345

(51) Int. Cl.
*H04L 12/66* (2006.01)
*H04L 7/00* (2006.01)

(52) U.S. Cl.
CPC .................. *H04L 7/0012* (2013.01)

(58) Field of Classification Search
CPC ...... H04J 3/0658; H04J 3/0697; H04J 3/0644; H04J 3/0685; H04L 69/28; G06F 1/12; G06F 1/14; G06F 13/42; H04N 21/242; H04N 21/4305
See application file for complete search history.

(56) References Cited

U.S. PATENT DOCUMENTS

| | | | | |
|---|---|---|---|---|
| 6,725,278 B1 * | 4/2004 | Gonzalez | ................ | H04L 69/32 709/227 |
| 2002/0069299 A1 * | 6/2002 | Rosener | ................... | H04L 9/40 709/248 |

FOREIGN PATENT DOCUMENTS

| | | | | |
|---|---|---|---|---|
| JP | 2018191226 A | | 11/2018 | |
| WO | WO-2004066530 A1 * | | 8/2004 | ............... G04G 7/00 |

* cited by examiner

*Primary Examiner* — Kharye Pope
(74) *Attorney, Agent, or Firm* — Canon U.S.A., Inc. IP Division

(57) ABSTRACT

A communication apparatus including a plurality of communication interfaces, a plurality of clocks, and a plurality of output units each associated with a corresponding clock, synchronizes the clocks with a time server, checks whether the clocks are in synchronization with the time server, and selects as a synchronization signal supplied to another apparatus a synchronization signal output from a corresponding output unit associated with the corresponding clock in synchronization with the time server from among the synchronization signals output from the output units. Each output unit starts outputting the signal when a time of the corresponding clock reaches a start time designated by an external apparatus, and outputs the signal when the time of the clock reaches the start time, even with the clock associated with the corresponding output unit out of synchronization with the time server.

8 Claims, 9 Drawing Sheets

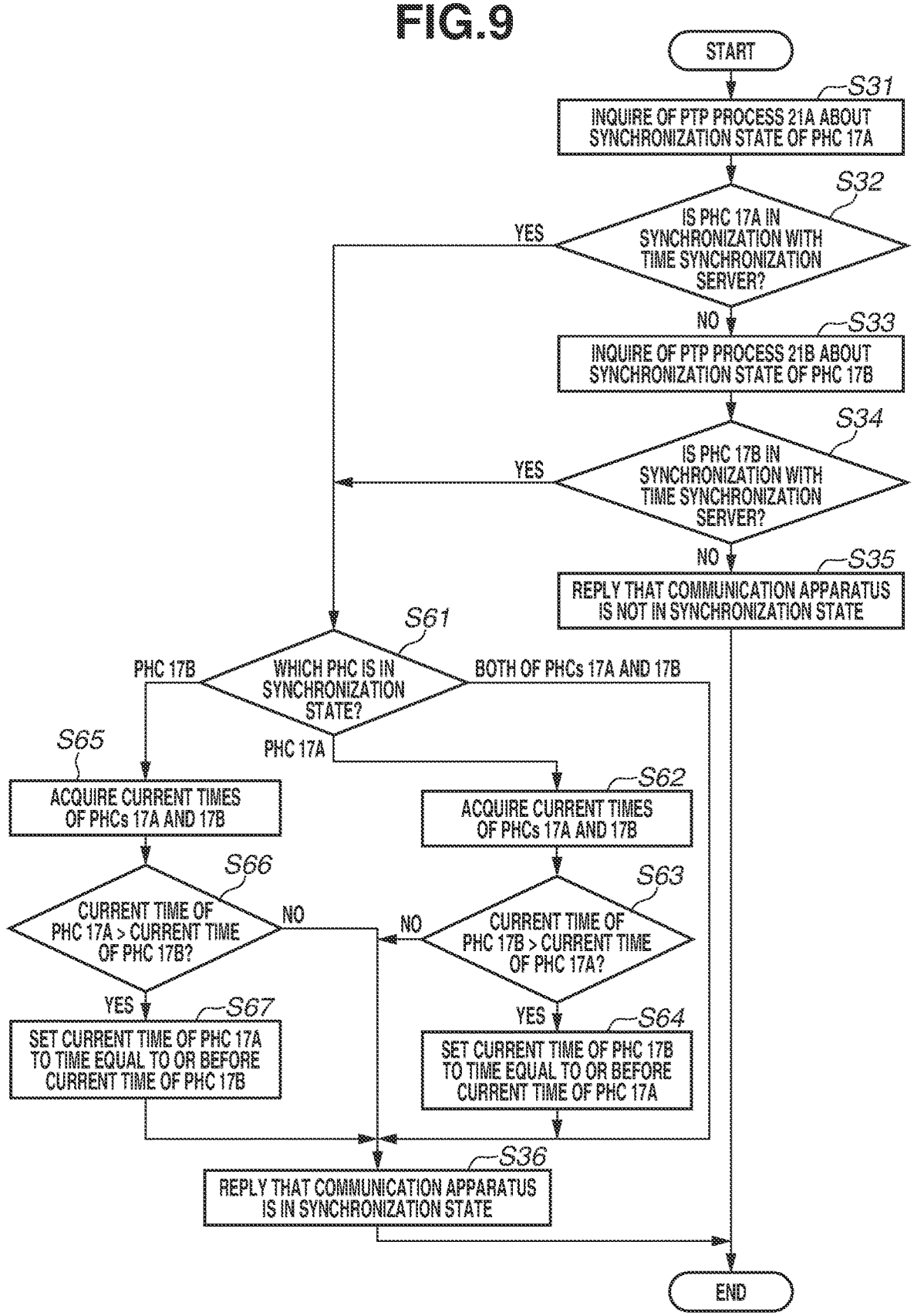

COMMUNICATION APPARATUS, SERVER SYSTEM, CONTROL METHOD FOR COMMUNICATION APPARATUS, AND STORAGE MEDIUM

BACKGROUND

Field of the Disclosure

The present disclosure relates to a communication apparatus, a server system, a control method for the communication apparatus, and a storage medium.

Description of the Related Art

Virtual viewpoint image generation systems are in widespread use these days. In a virtual viewpoint image generation system, a plurality of cameras installed at different positions synchronously captures multi-viewpoint images, and the multi-viewpoint images are used in creating a combined virtual viewpoint content. In this system, creating a combined virtual viewpoint image with high quality involves synchronizing image capturing timings of the plurality of cameras with high precision. To bring the times of a plurality of communication apparatuses connected to a network into synchronization with one another, Precision Time Protocol (PTP) is widely used.

In the PTP, a PTP Grand Master (GM) apparatus, which is a time server having a precise clock, and a PTP slave apparatus communicate with each other to establish time synchronization to synchronize the clock provided to a network interface of the PTP slave apparatus with the clock of the PTP GM apparatus (time server). A virtual viewpoint image generation system generates a synchronization signal used for synchronizing a plurality of cameras based on the synchronized clocks of the communication apparatuses.

Japanese Patent Application Laid-open No. 2018-191226 discusses a method of reducing time information jitter in a system that uses a time synchronization protocol such as the PTP.

A virtual viewpoint image generation system provided with a plurality of communication apparatuses in time synchronization to use a plurality of multi-viewpoint images through a network to create a combined virtual viewpoint content may be unable to make time synchronization due to troubles in network devices or communication lines. Such troubles could more often occur in a large virtual viewpoint image generation system including a large number of communication apparatuses or a virtual viewpoint image generation system installed in a vast area in particular.

To resolve, a system is conceivable in which each of the communication apparatuses includes a plurality of network interfaces and each of the network interfaces is connected independently to a time server. This configuration provides the system with redundancy, which leads to a reduction in trouble occurrence probability.

However, sufficient consideration in this case has not been given to how to control the generation of synchronization signals based on a plurality of clocks in the communication apparatuses (which clock should be based on to generate a synchronization signal). If time synchronization of the clocks is awaited due to different timings of completion of time synchronization of the clocks, that delays the generation of a time synchronization signal.

SUMMARY

The present disclosure is directed to a technique of appropriately controlling an output of a synchronization signal when time synchronization of a plurality of clocks in a communication apparatus is completed at different timings.

According to an aspect of the present disclosure, a communication apparatus includes a plurality of communication interfaces each connected to a time server, a plurality of clocks each associated with a corresponding communication interface of the plurality of communication interfaces, a plurality of output units each associated with a corresponding clock of the plurality of clocks, and each configured to output a synchronization signal using the associated corresponding clock as a reference, a synchronization unit configured to synchronize the plurality of clocks with the time server, a check unit configured to check whether the plurality of clocks is in synchronization with the time server, and a selection unit configured to select as a synchronization signal to be supplied to another apparatus a synchronization signal output from a corresponding output unit of the plurality of output units that is associated with the corresponding clock of the plurality of clocks that is in synchronization with the time server from among the plurality of synchronization signals output from the plurality of output units. Each of the plurality of output units starts outputting the synchronization signal in response to when a time of each of the plurality of clocks reaches a start time designated by an external apparatus. Each of the plurality of output units outputs the synchronization signal in response to when the time of the corresponding clock of the plurality of clocks reaches the start time, the corresponding clock of the plurality of clocks associated with the corresponding output unit of the plurality of output units being out of synchronization with the time server.

Further features of the present disclosure will become apparent from the following description of exemplary embodiments with reference to the attached drawings.

BRIEF DESCRIPTION OF THE DRAWINGS

FIG. 9 is a flowchart illustrating an operation by a PHC synchronization check process of a communication apparatus that has received a synchronization state inquiry command from a control apparatus, according to one or more aspects of the present disclosure.

DESCRIPTION OF THE EMBODIMENTS

Some exemplary embodiments of the present disclosure will be described in detail with reference to the attached drawings. The exemplary embodiments described below are mere examples to realize the present disclosure, and should be modified or changed as appropriate depending on various conditions with and configurations of apparatuses to which the present disclosure is applied. Thus, the present disclosure is not limited to the exemplary embodiments described below.

Figure 1:
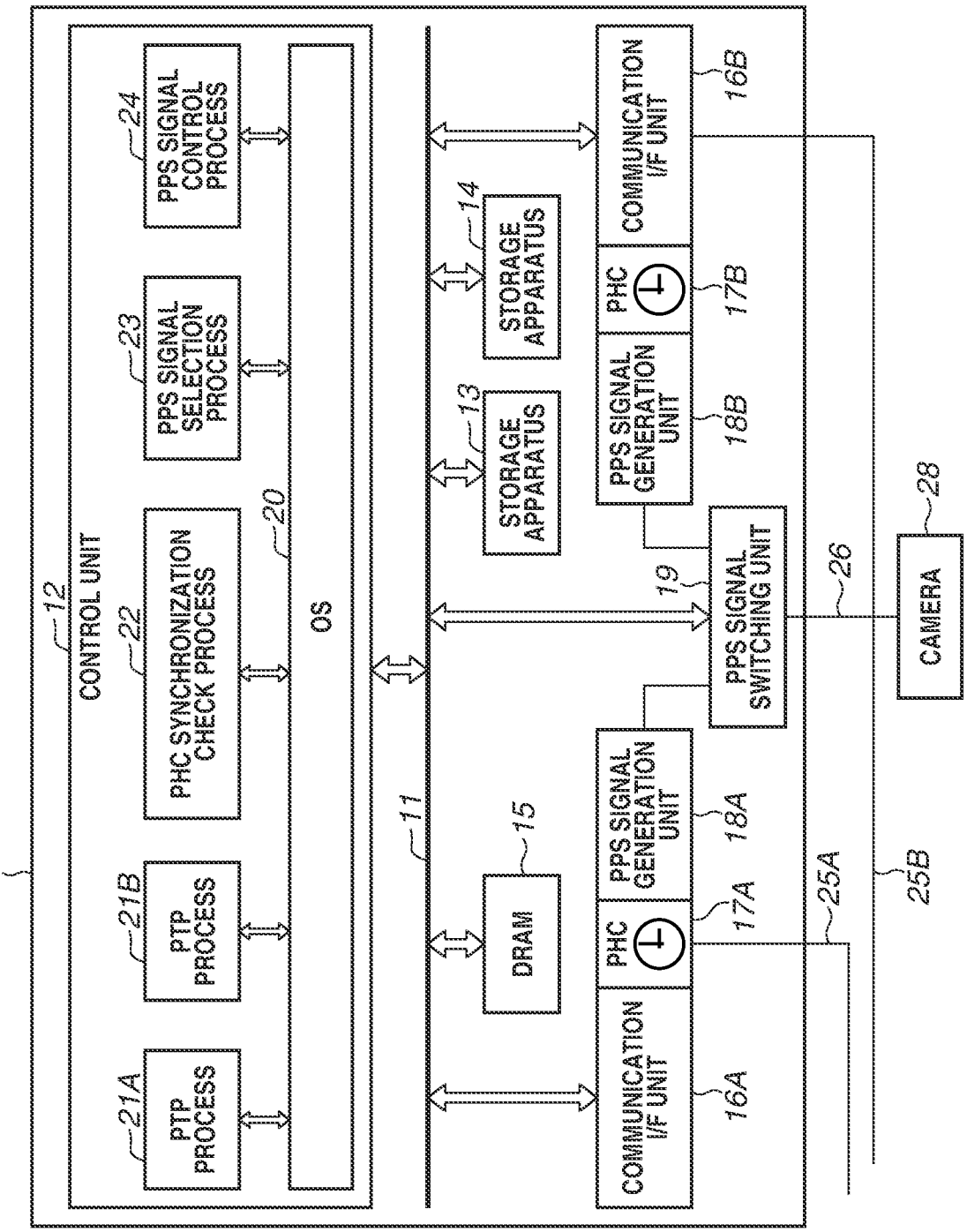
FIG. 1 is a block diagram illustrating the hardware configuration and the functional configuration of a communication apparatus according to one or more aspects of the present disclosure.

FIG. 1 is a block diagram illustrating the hardware configuration and the functional configuration of a communication apparatus 10 according to a first exemplary embodiment of the present disclosure. The communication apparatus 10 is a Precision Time Protocol (PTP) slave apparatus, and communicates with a PTP Grand Master (GM) apparatus, which is a time server, to synchronize the times of a plurality of clocks in the communication apparatus 10. The communication apparatus 10 is connected to a camera 28 to synchronize an image capturing timing of the camera 28 with the image capturing timings of other cameras (refer to FIG. 2) based on the synchronized time.

The communication apparatus 10 includes a system bus 11, a control unit 12, storage apparatuses 13 and 14, a dynamic random access memory (DRAM) 15, communication interface (I/F) units 16A and 16B, and a Pulse Per Second (PPS) signal switching unit 19. The control unit 12 is connected to the storage apparatuses 13 and 14, the DRAM 15, the communication I/F units 16A and 16B, and the PPS signal switching unit 19 via the system bus 11.

The control unit 12 includes one or more processors such as a central processing unit (CPU) and a micro processing unit (MPU), and generally controls the communication apparatus 10 by running computer programs stored in the storage apparatus 13. The CPU and the MPU each function as a computer. The control unit 12 may generally control the communication apparatus 10 in cooperation with an operating system (OS) 20 and computer programs stored in the storage apparatus 13 or 14. Further, the control unit 12 may include a plurality of processors such as a multi-core CPU to generally control communication apparatus 10 with the processors.

The storage apparatus 13 includes one or more memories, and stores computer programs to perform various kinds of operations to be described below, and various kinds of information such as communication parameters for wireless communications. The storage apparatus 13 also stores a program for a system program such as the OS 20 to boot from the storage apparatus 14.

Examples of a storage medium that can be used as the storage apparatus 13 include a read-only memory (ROM), a flexible disk, a hard disk, an optical disk, a magneto-optical disk, a compact disk ROM (CD-ROM), a CD-recordable (CD-R), a magnetic tape, a nonvolatile memory card, and a digital versatile disk (DVD).

The storage apparatus 14 stores a system program such as the OS 20 and application programs. The storage apparatus 14 includes one or more memories. Examples of a storage medium that can be used as the storage apparatus 14 include a ROM, a flexible disk, a hard disk, an optical disk, a magneto-optical disk, a CD-ROM, a CD-R, a magnetic tape, a nonvolatile memory card, and a DVD.

The DRAM 15 is a memory used as a working memory. Instead of or in addition to the DRAM 15, a static RAM (SRAM) or other RAMs may be used.

The communication I/F units 16A and 16B are connectors to be connected to a local area network (LAN), for example, in compliance with Ethernet®. For example, the communication I/F units 16A and 16B perform wired communications compliant with the Ethernet® standards. Cables 25A and 25B (e.g., Ethernet® cables) are respectively connected to the communication I/F units 16A and 16B, and the communication apparatus 10 communicates with an image delivery server system 30 (refer to FIG. 2) via both the communication I/F units 16A and 16B.

Further, the communication I/F unit 16A is associated with a PTP Hardware Clock (PHC) 17A and a PPS signal generation unit 18A. For example, the communication I/F unit 16A includes the PHC 17A and the PPS signal generation unit 18A. Similarly, the communication I/F unit 16B is associated with a PHC 17B and a PPS signal generation unit 18B. For example, the communication I/F unit 16B includes the PHC 17B and the PPS signal generation unit 18B.

The PHC is a clock used in the PTP. The communication apparatus 10 includes two internal clocks i.e., the PHCs 17A and 17B, and the PHCs 17A or 17B is used as a reference clock for the communication apparatus 10.

The PHCs 17A and 17B are used also in recording PTP packet transmission and reception times (Delay Request packet transmission time and synchronization (sync) packet reception time). The transmission and reception times of the PTP packets transmitted and received by the communication I/F unit 16A, respectively, are recorded by the PHC 17A. The transmission and reception times of the PTP packets transmitted and received by the communication I/F unit 16B, respectively, are recorded by the communication IF unit 16B.

Figure 2:
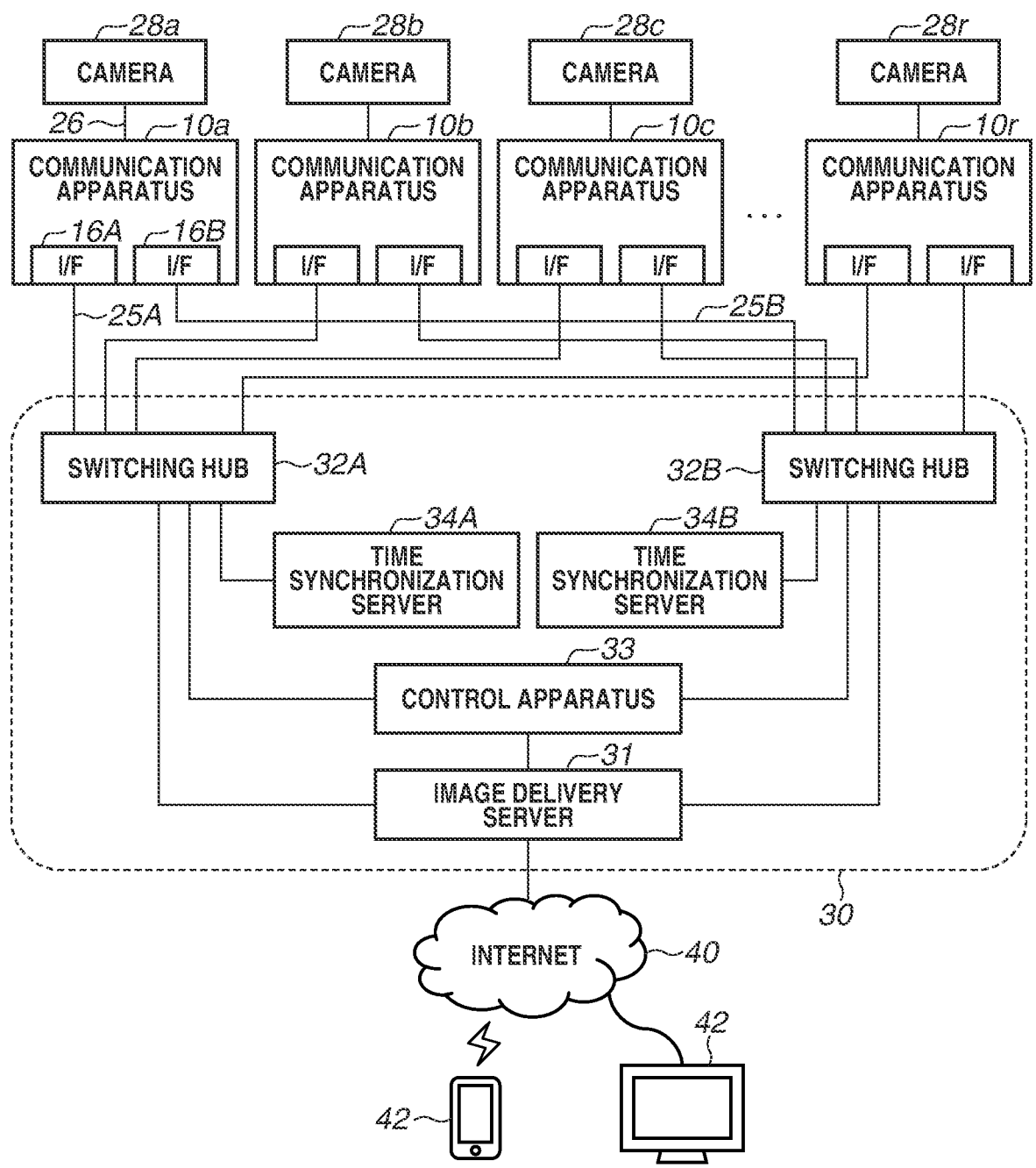
FIG. 2 is a block diagram illustrating an image communication system including a plurality of communication apparatuses according to one or more aspects of the present disclosure.

A PPS signal is a synchronization signal to synchronize the image capturing timing of the camera 28 with the image capturing timings of other cameras different from the camera 28 (refer to FIG. 2). In other words, a PPS signal is used as a GenLock signal for the camera 28. The PPS signal generation unit 18A is a counter for generating a PPS signal based on the time of the PHC 17A, and generates a PPS signal at the time and the frequency designated by a PPS signal control process 24 and outputs the generated PPS signal. Similarly, the PPS signal generation unit 18B is a counter for generating a PPS signal based on the time of the PHC 17B, and generates a PPS signal at the time and the frequency designated by the PPS signal control process 24 and outputs the generated PPS signal.

The control unit 12 includes the OS 20, PTP processes 21A and 21B, a PHC synchronization check process 22, a PPS signal selection process 23, and the PPS signal control process 24, as functional blocks. These functional blocks are carried out by the control unit 12 operating based on computer programs stored in the storage apparatuses 13 or 14.

The PTP process 21A communicates with a time synchronization server 34A (refer to FIG. 2) serving as a PTP GM apparatus using the communication OF unit 16A to adjust the time of the PHC 17A in a known PTP method. More specifically, the time synchronization server 34A transmits a Sync packet including a transmission time stamp of the time synchronization server 34A to the communication I/F unit 16A. The communication I/F unit 16A records a Sync packet reception time (based on the PHC 17A). The communication I/F unit 16A transmits a Delay Request packet including a transmission time stamp of the communication I/F unit 16A to the time synchronization server 34A. The time synchronization server 34A returns a Delay Response packet to the communication I/F unit 16A to notify the Delay Request packet reception time.

The PTP process 21A adjusts the PHC 17A based on the Sync packet transmission time stamp, the reception time of the Sync packet by the communication I/F unit 16A, the Delay Request packet transmission time stamp, and the reception time of the Delay Request packet by the time synchronization server 34A. More specifically, the PTP process 21A adjusts the time of the PHC 17A to synchronize with the time of the time synchronization server 34A by adjusting the frequency of the PHC 17A.

Similarly, the PTP process 21B communicates with a time synchronization server 34B (refer to FIG. 2) using the communication I/F unit 16B to adjust the time of the PHC 17B in a known PTP method.

The PTP processes 21A and 21B are repeated periodically to synchronize the times of the PHCs 17A and 17B with the times of the time synchronization servers 34A and 34B, respectively.

The PHC synchronization check process 22 works in response to a synchronization state inquiry command received by the communication OF units 16A and 16B from the image delivery server system 30 via the network. In response to the synchronization state inquiry command, the PHC synchronization check process 22 inquires of the PTP processes 21A and 21B about the synchronization states of the PHCs 17A and 17B, and sends to the image delivery server system 30 a reply indicating whether the PHCs 17A and 17B each are in a synchronization state.

The PPS signal selection process 23 inquires of the PTP processes 21A and 21B about the synchronization states, selects the PPS signal generation unit 18A or 18B as an output source of the PPS signal to synchronize the camera 28 depending on the synchronization states, and instructs the PPS signal switching unit 19 accordingly. More specifically, the PPS signal selection process 23 selects the PPS signal generation unit 18A or 18B corresponding to the PHC 17A or 17B that is synchronized with the corresponding time synchronization server 34A or 34B.

The PPS signal switching unit 19 is connected to the PPS signal generation units 18A and 18B, and the camera 28. The PPS signal switching unit 19 switches the PPS signal output for synchronizing the camera 28 to the output from the PPS signal generation unit 18A or the output from the PPS signal generation unit 18B following the instruction from the PPS signal selection process 23. For example, the PPS signal switching unit 19 is an electronic switch. The PPS signal output from the PPS signal generation unit 18A or 18B that is switched to by the PPS signal switching unit 19 is supplied to the camera 28 via a PPS signal line 26.

In response to an instruction of the image delivery server system 30, the PPS signal control process 24 designates a time to the PPS signal generation units 18A and 18B to issue a PPS signal output instruction and a PPS signal output stop instruction.

The camera 28 performs image capturing based on the PPS signal supplied from the PPS signal switching unit 19. Although the camera 28 can perform image capturing without using a PPS signal, the time synchronization of the camera 28 is established with the other cameras different from the camera 28 using the PPS signal if the image capturing is performed in synchronization with the other cameras different from the camera 28. The camera 28 may capture a video image such as a moving image and a still image, and may record voice together with the video image. A video image captured by the camera 28 may be stored in a storage built in the camera 28 or the communication apparatus 10 (e.g., storage apparatus 14 or 15), a storage in the image delivery server system 30 connected to the communication apparatus 10, or a storage on a cloud. The multi-viewpoint images captured and accumulated in synchronization by the cameras including the camera 28 accumulated can be combined into a virtual view point content. However, the video images captured by the cameras may be used on a real-time basis to create a virtual view point content without being stored in a storage.

FIG. 2 is a block diagram illustrating an image communication system including a plurality of communication apparatuses 10 according to the present exemplary embodiment. More specifically, this image communication system includes the communication apparatuses 10, i.e., communication apparatuses 10a to 10r. Hereinafter, the communication apparatuses 10a to 10r are sometimes simply referred to as the communication apparatuses 10 or the communication apparatus 10 except when description contains the discrimination. Cameras 28a to 28r are connected to the communication apparatuses 10a to 10r via the PPS signal lines 26, respectively. Hereinafter, the cameras 28a to 28r are sometimes simply referred to as the cameras 28 or the camera 28, except when description contains the discrimination.

The communication I/F unit 16A of each of the communication apparatuses 10 is connected to a switching hub 32A of the image delivery server system 30 via the cable 25A, and the communication I/F unit 16B is connected to a switching hub 32B via the cable 25B. Thus, each of the communication apparatuses 10 can transmit image data captured by each camera 28 connected to the corresponding communication apparatus 10 to the image delivery server system 30. Each of the communication apparatuses 10 may transmit image data captured by the camera 28 connected to the corresponding communication apparatus 10 to another communication apparatus 10 different from the communication apparatus 10 as appropriate.

The image communication system includes the image delivery server system 30. The image delivery server system 30 includes an image delivery server 31, the switching hubs 32A and 32B, a control apparatus 33, and the time synchronization servers 34A and 34B.

The image delivery server 31 accumulates and processes the image data received from the communication apparatuses 10a to 10r via the switching hubs 32A and 32B. Further, the image delivery server 31 receives a request from any one of end user apparatuses 42 via the Internet 40, create a virtual viewpoint content based on the accumulated image data in response to the request, and transmits the virtual viewpoint content to the corresponding end user apparatus 42 that serves as a request source.

The control apparatus 33 controls the image delivery server 31. Further, the control apparatus 33 issues a PPS signal output instruction and a PPS signal output stop instruction to each of the communication apparatuses 10 via the switching hubs 32A or 32B, to synchronize the cameras 28, and issues a transmission instruction and a transmission stop instruction for an camera image to the image delivery server system 30. The control apparatus 33 includes one or more processors such as a CPU and an MPU, and performs the processing by running computer programs stored in a storage apparatus (not illustrated).

The time synchronization servers 34A and 34B each are a PTP GM apparatus. The time synchronization servers 34A and 34B each transmit a PTP Sync packet in a multicast manner, receives a Delay Request packet from each of the communication apparatuses 10 (PTP slave apparatus), and transmits a Delay Response packet thereto. In this way, each of the communication apparatuses 10 performs the time synchronization of the PHCs 17A and 17B. More specifically, the time synchronization server 34A transmits a Sync packet for the communication I/F unit 16A of each of the communication apparatuses 10, receives a Delay Request packet from the communication I/F unit 16A, and transmits a Delay Response packet to the communication I/F unit 16A. The switching hub 32A is connected to the time synchronization server 34A, and the time synchronization server 34A transmits and receives a PTP packet via the switching hub 32A.

The time synchronization server 34B transmits a Sync packet for the communication I/F unit 16B of each of the communication apparatuses 10, receives a Delay Request packet from the communication I/F unit 16B, and transmits a Delay Response packet to the communication I/F unit 16B. The switching hub 32B is connected to the time synchronization server 34B, and the time synchronization server 34B transmits and receives a PTP packet via the switching hub 32B.

The time synchronization servers 34A and 34B synchronize the times thereof using time information distributed by a Global Positioning System (GPS). That means the time synchronization servers 34A and 34B are synchronized with each other in time.

Next, an operation by the PPS signal selection process 23 of the communication apparatus 10 will be described with reference to FIG. 3.

First, in step S1, the PPS signal selection process 23 temporarily sets the PHC 17A to a PPS signal selection flag. In step S2, the PPS signal selection process 23 sets the PPS signal switching unit 19 to supply a PPS signal from the PPS signal generation unit 18A to the camera 28.

Next, in step S3, the PPS signal selection process 23 checks the synchronization state between the time synchronization server 34A and the PHC 17A from the PTP process 21A, and checks the synchronization state between the time synchronization server 34B and the PHC 17B from the PTP process 21B, using the PHC synchronization check process 22.

Then, in step S4, the PPS signal selection process 23 checks the PPS signal selection flag.

A case where the PPS signal selection flag is the PHC 17A (YES in step S4) will be described first. In this case, the PPS signal selection process 23 proceeds to step S5. In step S5, if the PHC 17A is in a synchronization state with the time synchronization server 34A as a result of the synchronization state check in step S3 (YES in step S5), the PPS signal selection process 23 returns to step S3. This is because the PPS signal supplied from the PPS signal switching unit 19 to the camera 28 is not switched.

On the other hand, if the PHC 17A is not in a synchronization state (NO in step S5), the PPS signal selection process 23 proceeds to step S6. In step S6, the PPS signal selection process 23 checks whether the PHC 17B is in synchronization with the time synchronization server 34B. If the PHC 17B is not in synchronization with the time synchronization server 34B (No in step S6), neither the PHC 17A nor the PHC 17B is in a synchronization state. In this case (No in step S6), the PPS signal selection process 23 does not switch the PPS signal switching unit 19, and returns to step S3. As a result, the PPS signal from the PPS signal generation unit 18A is kept being supplied to the camera 28.

If the PHC 17B is in a synchronization state (YES in step S6), the PPS signal selection process 23 proceeds to step S7. In step S7, the PPS signal selection process 23 sets the PHC 17B to the PPS signal selection flag. Thus, in step S8, the PPS signal selection process 23 sets the PPS signal switching unit 19 to supply a PPS signal from the PPS signal generation unit 18B to the camera 28. Then, the PPS signal selection process 23 returns to step S3.

A case where the PPS signal selection flag is the PHC 17B (NO in step S4) will be described. If the PHC 17B is in synchronization with the time synchronization server 34B as a result of the synchronization state check in step S3 (YES in step S9), the PPS signal selection process 23 returns to step S3. This is because the PPS signal supplied from the PPS signal switching unit 19 to the camera 28 is not switched.

On the other hand, if the PHC 17B is not in a synchronization state (NO in step S9), the PPS signal selection process 23 proceeds to step S10. In step S10, the PPS signal selection process 23 checks whether the PHC 17A is in synchronization with the time synchronization server 34A. If the PHC 17A is not in synchronization with the time synchronization server 34A (NO in step S10), neither the PHC 17B nor the PHC 17A is in a synchronization state. In this case (No in step S10), the PPS signal selection process 23 does not switch the PPS signal switching unit 19, and returns to step S3. As a result, the PPS signal from the PPS signal generation unit 18B is kept being supplied to the camera 28.

If the PHC 17A is in a synchronization state (YES in step S10), the PPS signal selection process 23 proceeds to step S11. In step S11, the PPS signal selection process 23 sets the PHC 17A to a PPS signal selection flag. Thus, in step S12, the PPS signal selection process 23 sets the PPS signal switching unit 19 to supply a PPS signal from the PPS signal generation unit 18A to the camera 28. Then, the PPS signal selection process 23 returns to step S3.

As described above, the PPS signal selection process 23 selects a PPS signal based on the PHC synchronized with the time synchronization server to switch the PPS signal switching unit 19 to output the selected PPS signal. In this way, a PPS signal in synchronization with the time synchronization server can be output through the PPS signal line 26.

If an apparatus in the image delivery server system 30 (e.g., time synchronization server 34A or 34B, or hubs 32A or 32B) has a trouble, the PPS signal selection process 23 selects the PPS signal generation unit corresponding to the PHC in synchronization with the time synchronization server 34A or 34B. In this way, even if one of the PHCs is out of synchronization, a PPS signal in synchronization with the time synchronization server 34A or 34B can be supplied to the camera 28.

The PPS signal generation unit 18A or 18B outputs a PPS signal in the above-described example. However, if neither the PHC 17A nor 17B is in synchronization with the time synchronization server 34A or 34B, a PPS signal generated by the PHC in use can be supplied to the camera 28, by not switching the PPS signal switching unit 19. In this case, the image capturing timing of the camera 28 may be out of synchronization with the image capturing timings of the other cameras. However, since the PTP processes 21A and 21B periodically synchronize the times of the PHCs 17A and 17B with the time synchronization servers 34A and 34B, respectively, a PPS signal supplied to the camera 28 eventually synchronizes with the time synchronization server 34A or 34B. Further, the situation where neither the PHC 17A nor 17B is in the synchronization state can be prevented by operations illustrated in FIG. 4 and FIG. 5 to be described below.

Figure 4:
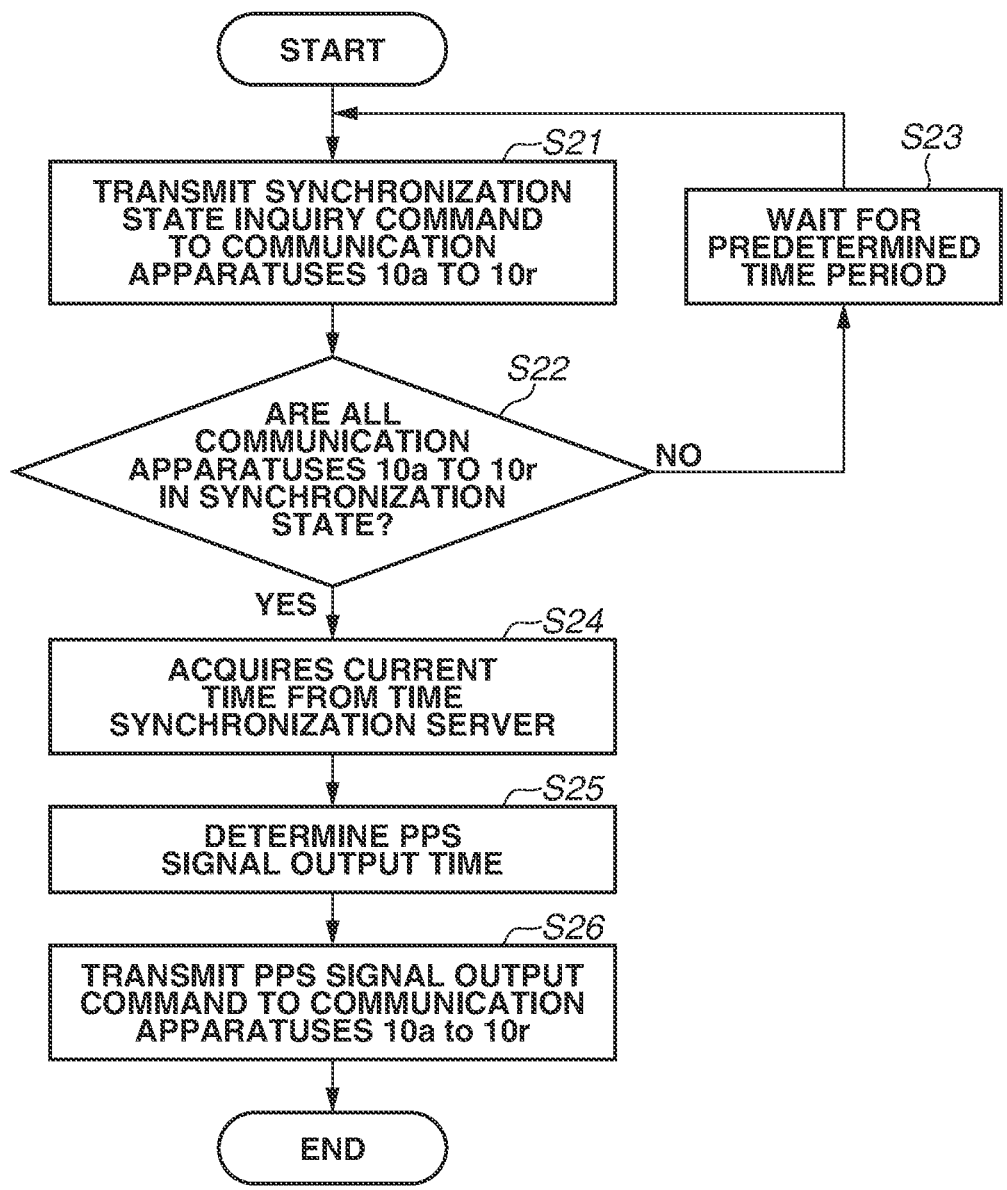
FIG. 4 is a flowchart illustrating an operation for transmitting a PPS signal output command to the communication apparatuses performed by a control apparatus.

FIG. 4 is a flowchart illustrating an operation performed by the control apparatus 33 in FIG. 2 for transmitting a PPS signal output command to the communication apparatuses 10a to 10r to synchronize the cameras 28a to 28r. In response to a PPS signal output command, the communication apparatuses 10a to 10r output PPS signals to the cameras 28a to 28r to synchronize the cameras 28a to 28r, respectively.

First, in step S21, the image delivery server system 30 transmits a synchronization state inquiry command to the communication apparatuses 10a to 10r in a multicast manner. Upon receiving the synchronization state inquiry command, each of the communication apparatuses 10 operates as described below according to a flowchart in FIG. 5, to send to the image delivery server system 30 a reply indicating whether each of the communication apparatuses 10 is in a synchronization state. "In a synchronization state" in this case means that at least one of the PHC 17A or 17B in each of the communication apparatuses 10 is in synchronization with the corresponding time synchronization server of the time synchronization servers 34A and 34B. Further, "in a synchronization state" also means that the communication apparatus 10 is in a state of being able to output a PPS signal.

Next, in step S22, the control apparatus 33 refers to the replies from the communication apparatuses 10a to 10r to determine whether all the communication apparatuses 10a to 10r are in a synchronization state. If not all the communication apparatuses 10a to 10r are in a synchronization state (NO in step S22), the processing proceeds to step S23. In step S23, the control apparatus 33 waits for a predetermined time period (e.g., 1 second), and then the processing returns to step S21 to transmit a synchronization state inquiry command again.

If all the communication apparatuses 10a to 10r are in a synchronization state (YES in step S22), the processing proceeds to step S24. In step S24, the control apparatus 33 acquires a current time of the time synchronization server 34A or 34B.

Next, in step S25, the control apparatus 33 determines a time at which each of the communication apparatuses 10a to 10r is to output the PPS signal based on the acquired current time. The PPS signal output time is a time after the current time and determined in consideration of the fact that the communication apparatuses 10a to 10r that will receive the PPS signal output command via the network (e.g., 10 seconds after the current time). Then, in step S26, the control apparatus 33 transmits the PPS signal output command to the communication apparatuses 10a to 10r. The PPS signal output command designates the time and the frequency of the PPS signal for each of the communication apparatuses 10a to 10r to start outputting.

Figure 5:
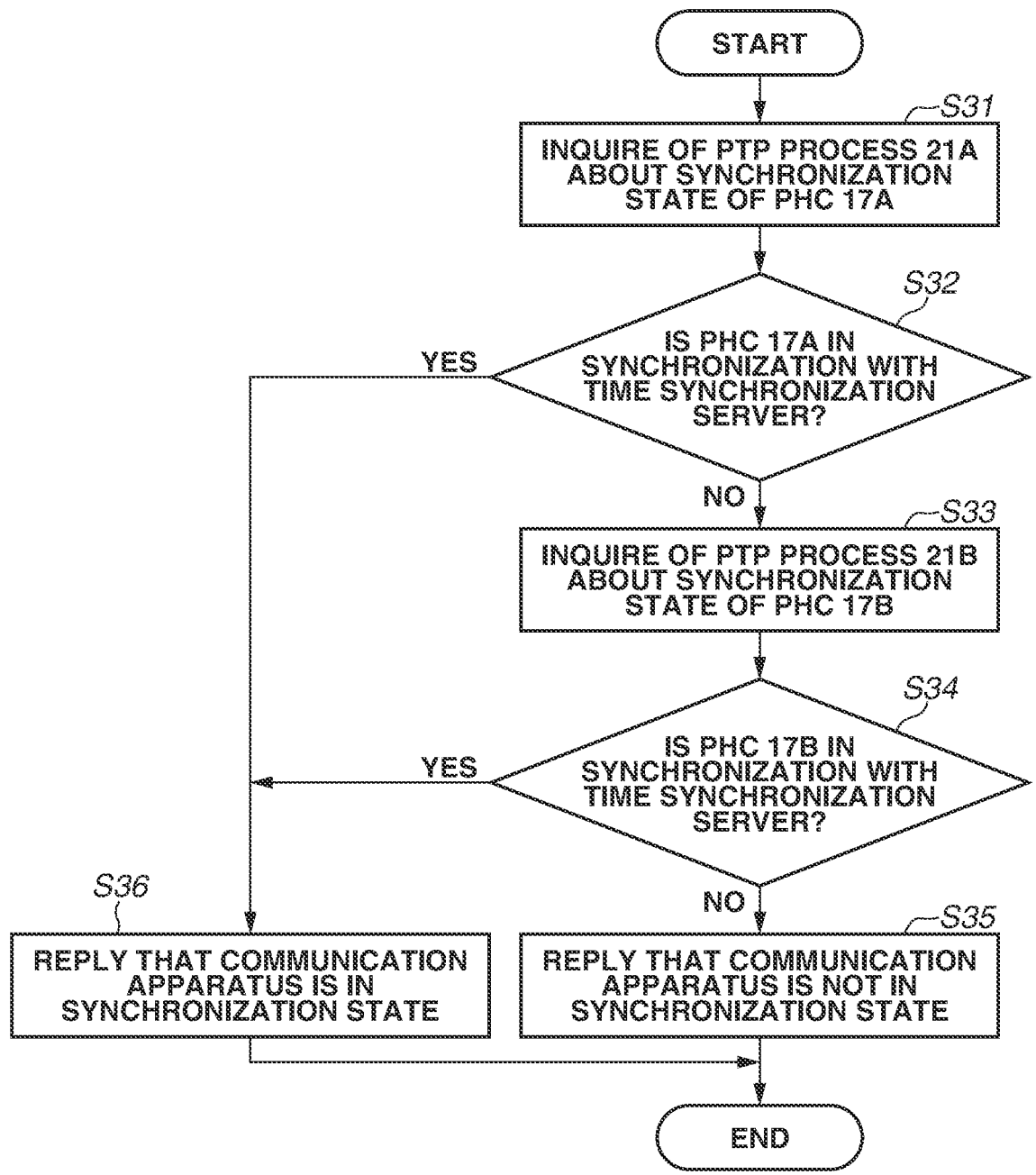
FIG. 5 is a flowchart illustrating an operation by a Precision Time Protocol Hardware Clock (PHC) synchronization check process of the communication apparatus that has received a synchronization state inquiry command from the control apparatus, according to one or more aspects of the present disclosure.

FIG. 5 is a flowchart illustrating an operation by the PHC synchronization check process 22 of the communication apparatus 10 that has received a synchronization state inquiry command from the control apparatus 33.

This operation starts in response to when the communication I/F unit 16A and/or 16B in the communication apparatus 10 receives a synchronization state inquiry command from the control apparatus 33.

First, in step S31, the PHC synchronization check process 22 inquires of the PTP process 21A about the synchronization state of the PHC 17A. In step S32, if the PHC 17A is in synchronization with the time synchronization server 34A (YES in step S32), the PHC synchronization check process 22 proceeds to step S36. In step S36, the PHC synchronization check process 22 sends to the control apparatus 33 a reply indicating that "the communication apparatus 10 is in a synchronization state".

In step S32, if the PHC 17A is out of synchronization with the time synchronization server 34A (NO in step S32), the PHC synchronization check process 22 proceeds to step S33. In step S33, the PHC synchronization check process 22 inquires of the PTP process 21B about the synchronization state of the PHC 17B. If the PHC 17B is in synchronization with the time synchronization server 34B (YES in step S34), the PHC synchronization check process 22 proceeds to step S36. In step S36, the PHC synchronization check process 22 sends to the control apparatus 33 a reply indicating that "the communication apparatus 10 is in a synchronization state".

If where the PHC 17B is out of synchronization with the time synchronization server 34B (NO in step S34), the PHC synchronization check process 22 proceeds to step S35. In step S35, the PHC synchronization check process 22 sends to the control apparatus 33 a reply indicating that "the communication apparatus 10 is not in a synchronization state".

In the PTP, the synchronization (time adjustment) of the PHC with the time synchronization server, which is a PTP GM apparatus, is performed by the frequency adjustment of the PHC unless the time of the PHC is largely different from the time of time synchronization server. In this case, the time of the PHC does not jump over or return. Further, a crystal clock mounted on the PHC tends to be fast or slow, the difference from time of the PHC can be made smaller by the frequency adjustment even in a period during which the PHC does not receive the time information from the time synchronization server.

However, in the time synchronization by the frequency adjustment, there are variations in accuracy of the crystal oscillator mounted on the PHC and in time taken to synchronize the PHC depending on the situation of the network. AS illustrated in FIG. 5, with the PHCs 17A or 17B in a synchronization state, if the PHC that has taken a short time to establish synchronization becomes in a synchronization state by a reply being sent indicating that "the communication apparatus 10 is in a synchronization state", the communication apparatus 10 can send to the control apparatus 33 a reply indicating that "the communication apparatus 10 is in a synchronization state". That reduces time taken to complete the loop processing in steps S21, S22, and S23, and expedites the PPS signal output start of each of the communication apparatuses 10a to 10r.

Figure 6:
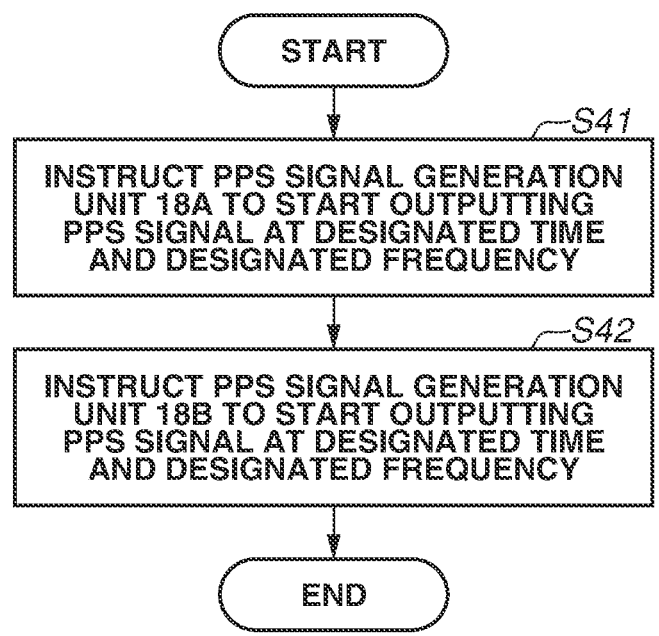
FIG. 6 is a flowchart illustrating an operation by a PPS signal control process of the communication apparatus that has received the PPS signal output command transmitted by the control apparatus, according to one or more aspects of the present disclosure.

FIG. 6 is a flowchart illustrating an operation by the PPS signal control process 24 of the communication apparatus 10 that has received a PPS signal output command transmitted by the control apparatus 33.

This operation starts in response to when the communication I/F unit 16A and/or 16B in the communication apparatus 10 receives a PPS signal output command (step S26 in FIG. 4) from the control apparatus 33.

Upon receiving the PPS signal output command, in step S41, the PPS signal control process 24 instructs the PPS signal generation unit 18A to start outputting a PPS signal at the start time and the frequency designated by the PPS signal output command. The PPS signal generation unit 18A outputs a PPS signal at the designated frequency in response to when the time of the PHC 17A reaches the start time.

Similarly, in step S42, the PPS signal control process 24 instructs the PPS signal generation unit 18B to start outputting a PPS signal at the start time and the frequency designated by the PPS signal output command. The PPS signal generation unit 18B starts outputting the PPS signal at the designated frequency in response to when the time of the PHC 17B reaches the start time.

As illustrated in FIG. 5, the PHC synchronization check process 22 sends a reply indicating that "the communication apparatus 10 is in a synchronization state" to the control apparatus 33, even if not both the PHCs 17A and 17B is in a synchronization state, i.e., as long as either the PHCs 17A or 17B is in a synchronization state. Further, as illustrated in FIG. 4, upon receiving the reply indicating that "the communication apparatus 10 is in a synchronization state" from each of the communication apparatuses 10a to 10r, the control apparatus 33 transmits the PPS signal output command to each of the communication apparatuses 10a to 10r. Then, as illustrated in FIG. 6, the PPS signal control process 24 of the communication apparatus 10 instructs each of the PPS signal generation units 18A and 18B to output the PPS signal. Thus, each of the PPS signal generation units 18A and 18B outputs a synchronization signal in response to when the time of the PHC reaches the designated time even if the PHC associated with either of the PPS signal generation units 18A and 18B is not in synchronization with the corresponding time synchronization server of the time synchronization servers 34A and 34B.

Figure 3:
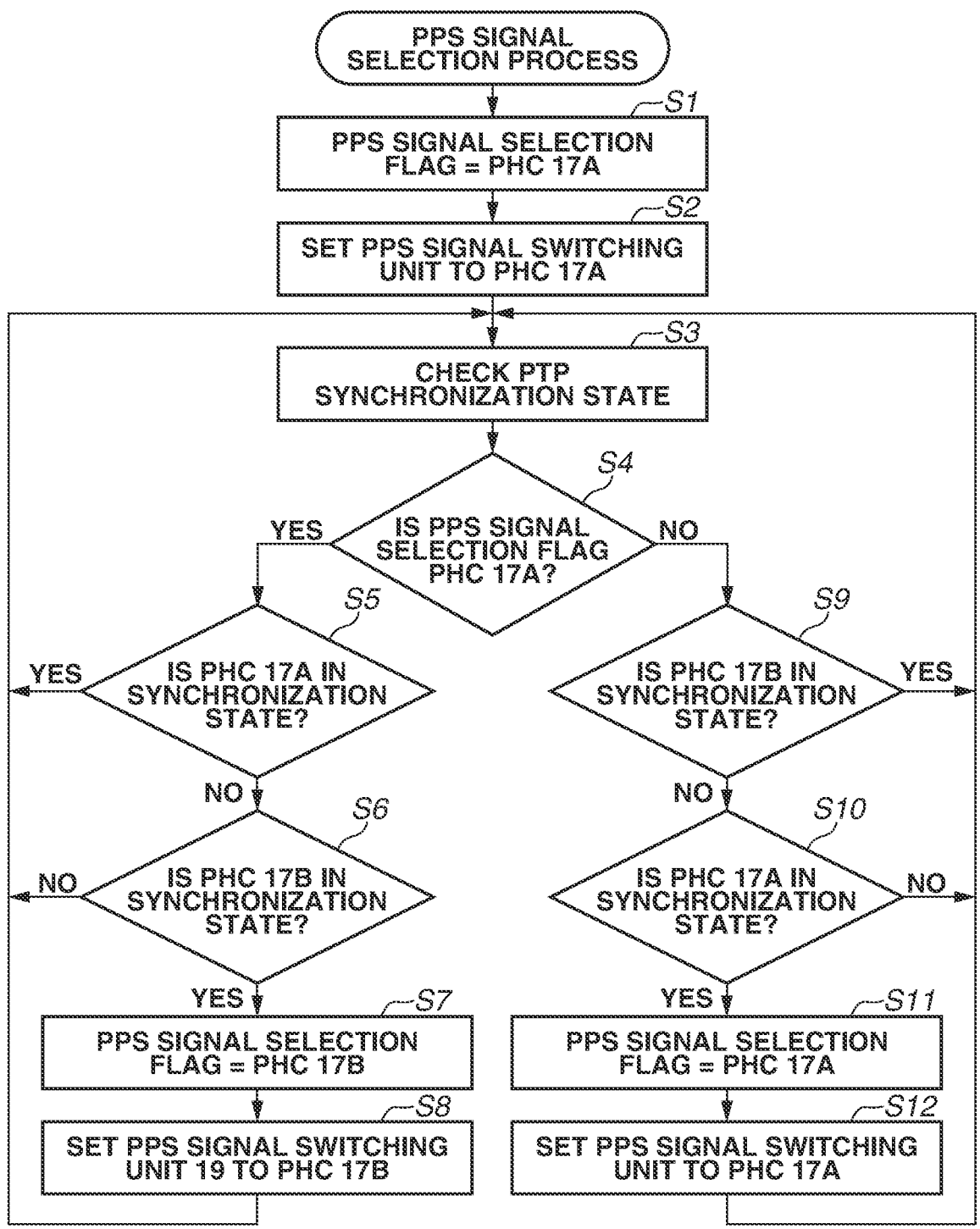
FIG. 3 is a flowchart of a Pulse Per Second (PPS) signal selection process of the communication apparatus according to one or more aspects of the present disclosure.

Even if not both the PHC 17A and 17B is in a synchronization state at the start time of outputting PPS a signal from the PPS signal generation units 18A and/or 18B, the PPS signal corresponding to the PHC in a synchronization state is selected as the PPS signal selection process 23 performs the processing in FIG. 3. Thus, a PPS signal in a synchronization state is supplied to the camera 28 via the PPS signal line 26.

Upon receiving the PPS signal output command from the control apparatus 33, the PPS signal generation units 18A and 18B of each of the communication apparatuses 10 start outputting PPS signals at the same time based on the time of the PHC 17A or 17B as the reference, even if not both the PHC 17A and 17B is in a synchronization state. However, since the PTP processes 21A and 21B periodically synchronize the times of the PHCs 17A and 17B with the time synchronization servers 34A and 34B, respectively, the times of the PHC 17A and 17B will eventually synchronize with the respective time synchronization servers 34A and 34B. In other words, the frequencies and phases of the PPS signals output from the two PPS signal generation units 18A and 18B eventually become in agreement with each other. The PPS signal selection process 23 supplies one of the PPS signals to the camera 28, but after the frequencies and phases of the PPS signals output from the PPS signal generation units 18A and 18B come in agreement with each other, either of the PPS signals may be supplied to the camera 28.

Figure 7:
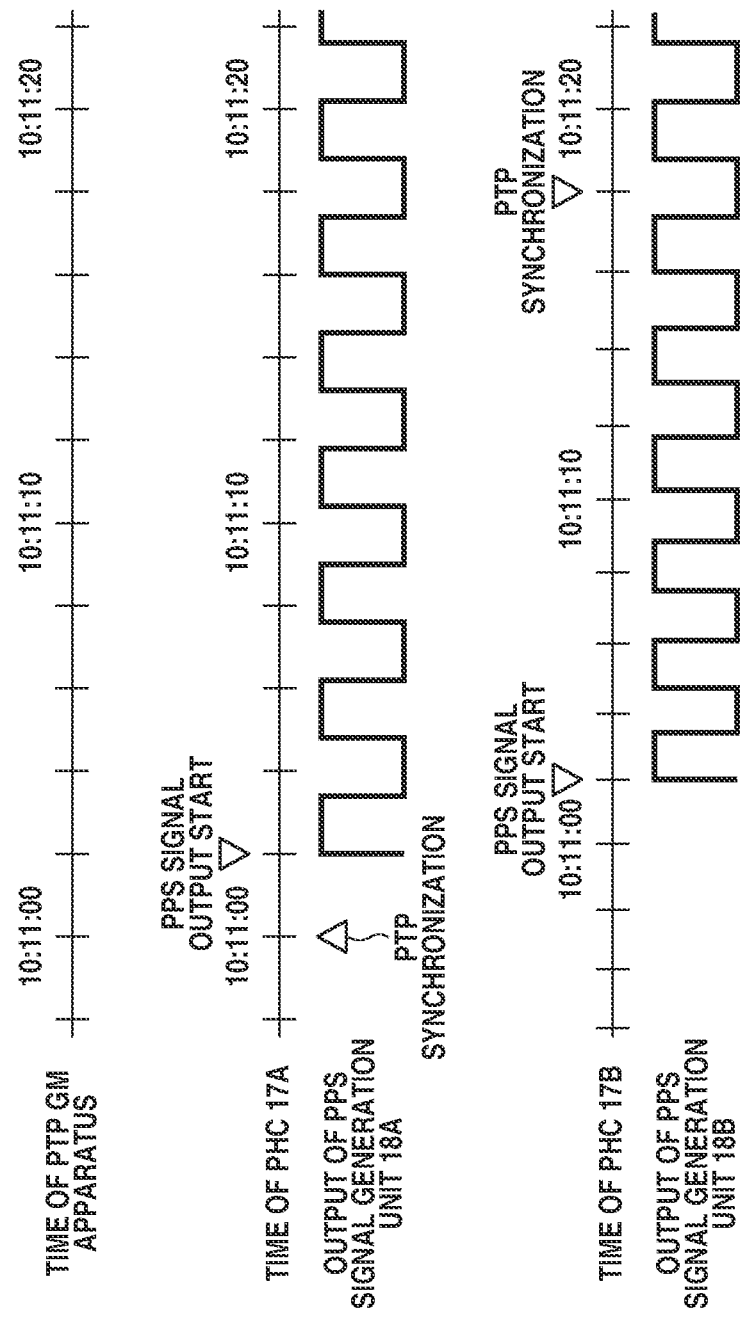
FIG. 7 is a diagram illustrating examples of time charts of the time of a time server (PTP Grand Master (GM) apparatus), the time of one PHC and a PPS signal, and the time of the other PHC and a PPS signal.

A specific example will be described with reference to FIG. 7. FIG. 7 illustrates examples of a time of the time server (PTP GM apparatus), a time of the PHC 17A, a PPS signal output from the PPS signal generation unit 18A, a time of the PHC 17B, and a PPS signal output from the PPS signal generation unit 18B.

As illustrated in FIG. 7, the PHC 17A synchronizes with the PTP GM apparatus at 10:11:00, and the PHC 17B synchronizes with the PTP GM apparatus at 10:11:18. The PPS signal generation unit 18A starts outputting a PPS signal at 10:11:02 when the PHC 17A is already in synchronization with the PTP GM apparatus. The PPS signal generation unit 18B also starts outputting a PPS signal at the same time. In practice, as the PHC 17B is not in synchronization with the PTP GM apparatus, the PPS signal starts being output at a different time. However, at and after 10:11:18 when the PHC 17B is in synchronization with the PTP GM apparatus, the phase and the frequency of the PPS signal output from the PPS signal generation unit 18A are agreement with those output from the PPS signal generation unit 18B, respectively.

With a configuration that each of the PPS signal generation units 18A and 18B of the communication apparatus 10 outputs a PPS signal with each of the PHCs 17A and 17B in synchronization with the corresponding PTP GM apparatus, the control apparatus 33 would designate each output time of the two PPS signals synchronized at different times. PPS signal frequencies used in capturing a moving image include 25 Hz and 29.97 Hz, but 29.97 Hz is a decimal and it takes time to calculate the designation time. Thus, it is advantageous to start outputting the PPS signals at the same time determined based on each of the times of the PHCs as references, because the calculation and the designation of the designation time are easy, which is advantageous.

A second exemplary embodiment will be described. A hardware configuration and a functional configuration of the communication apparatus 10, and a configuration of an image communication system according to the second exemplary embodiment are the same as those described in the first exemplary embodiment with reference to FIGS. 1 and 2.

Figure 8:
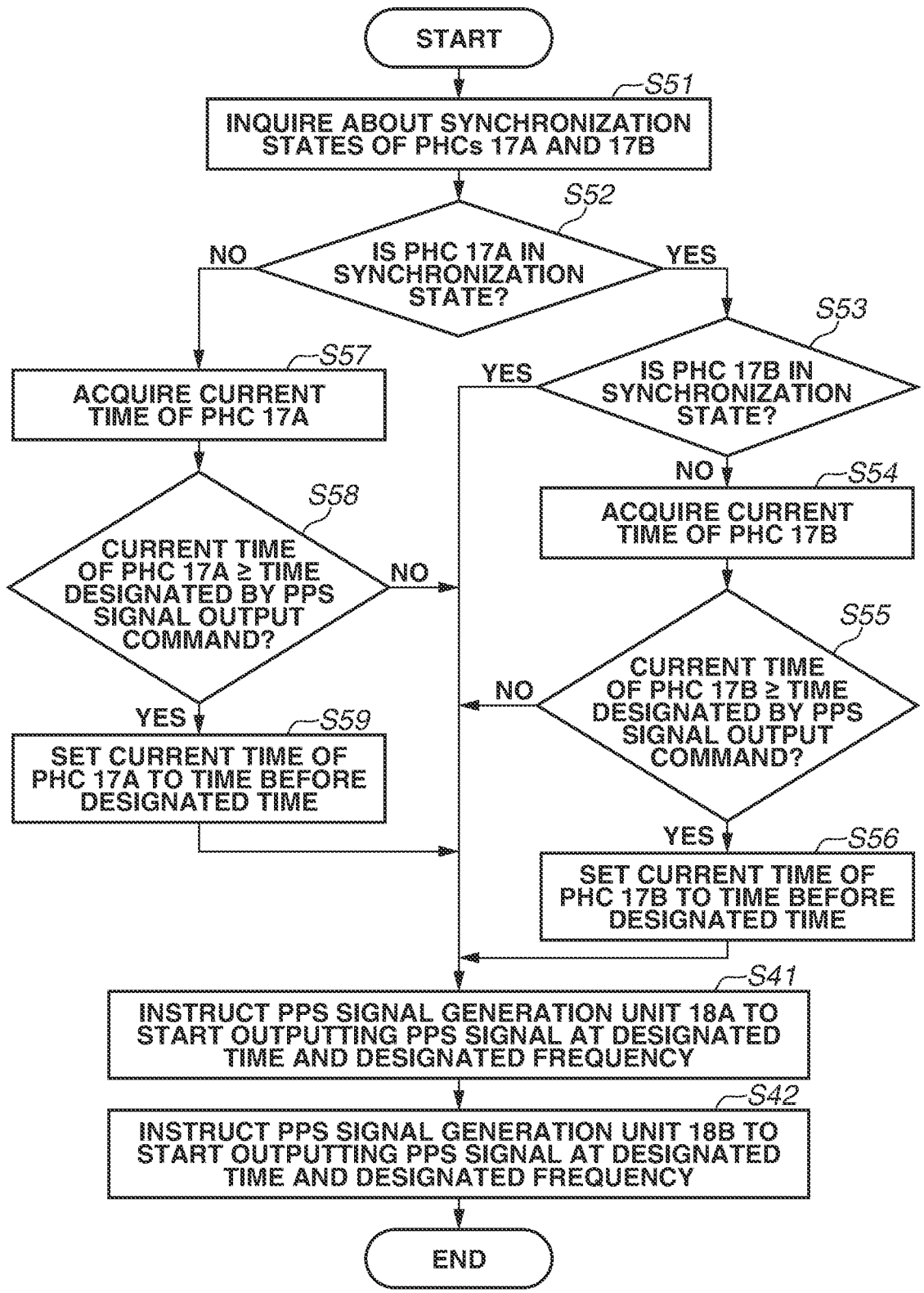
FIG. 8 is a flowchart illustrating an operation by a PPS signal control process of a communication apparatus that has received a PPS signal output command transmitted by a control apparatus, according to one or more aspects of the present disclosure.

FIG. 8 is a flowchart illustrating an operation performed by the PPS signal control process 24 of the communication apparatus 10 that has received the PPS signal output command transmitted by the control apparatus 33, according to the second exemplary embodiment. The PPS signal control process 24 illustrated in FIG. 6 instructs each of the PPS signal generation units 18A and 18B to start outputting a PPS signal at the time designated by a PPS signal output command even if not both the PHC 17A and 17B is in a synchronization state. If the current time of the PHC 17A or 17B that is not in a synchronization state is behind the designated PPS signal output start time, the PPS signal generation unit corresponding to the PHC cannot output a PPS signal.

This issue can be resolved by the PPS signal control process 24 according to the second exemplary embodiment.

The operation in FIG. 8 starts in response to when the communication I/F unit 16A and/or 16B of the communication apparatus 10 receives a PPS signal output command (step S26 in FIG. 4) from the control apparatus 33.

In step S51, upon receiving the PPS signal output command, the PPS signal control process 24 inquires of the PTP processes 21A and 21B about the synchronization states of the PHCs 17A and 17B using the PHC synchronization check process 22.

In step S52, if the PHC 17A is in synchronization with the time synchronization server 34A (YES in step S52), the processing proceeds to step S53. In step S53, the PPS signal control process 24 further determines whether the PHC 17B is in synchronization with the time synchronization server 34B. In step S53, if the PHC 17B is in synchronization with the time synchronization server 34B (YES in step S53), the PPS signal control process 24 proceeds to step S41, and then to step S42. The processing in steps S41 and S42 is the same as that described with reference to FIG. 6.

Thus, if both of the PHCs 17A and 17B are in a synchronization state, each of the PPS signal generation units 18A and 18B starts outputting a PPS signal at the time and the frequency designated by the PPS signal output command.

In step S53, if the PHC 17B is not in a synchronization state (NO in step S53), the PPS signal control process 24 proceeds to step S54. In step S54, the PPS signal control process 24 acquires the current time of the PHC 17B. In step S55, the PPS signal control process 24 compares the current time of the PHC 17B with the PPS signal output start time designated by the PPS signal output command. If the current time of the PHC 17B is at or after the PPS signal output start time designated by the PPS signal output command (YES in step S55), the PPS signal control process 24 proceeds to step S56.

In step S56, the PPS signal control process 24 sets the current time of the PHC 17B to a time before the PPS signal output start time designated by the PPS signal output command. Then, the PPS signal control process 24 proceeds to step S41, and then to step S42. As a result, the PPS signal generation unit 18B associated with the PHC 17B that is not in synchronization with the time synchronization server 34B outputs a PPS signal in response to when the time of the PHC 17B of which the current time is set as described above reaches the output start time. In other words, if the current time of the PHC 17B is the PPS signal output start time or after the PPS signal output start time, the current time of the PHC 17B is set back so that the PPS signal generation unit 18B can output a PPS signal.

In step S55, if the current time of the PHC 17B is before the PPS signal output start time (NO in step S55), the PPS signal control process 24 proceeds to step S41, and then to step S42.

In step S52, if the PHC 17A is not in a synchronization state (NO in step S52), the PPS signal control process 24 proceeds to step S57. In step S57, the PPS signal control process 24 acquires the current time of the PHC 17A.

In step S58, the PPS signal control process 24 compares the current time of the PHC 17A with the PPS signal output start time designated by the PPS signal output command. If the current time of the PHC 17A is after the PPS signal output start time designated by the PPS signal output command (YES in step S58), the PPS signal control process 24 proceeds to step S59.

In step S59, the PPS signal control process 24 sets the current time of the PHC 17A to a time before the PPS signal output start time designated by PPS signal output command. Then, the PPS signal control process 24 proceeds to step S41, and then to step S42. As a result, the PPS signal generation unit 18A associated with the PHC 17A that is not in synchronization with the time synchronization server 34A outputs a PPS signal in response to when the time of the PHC 17A of which the current time is set as described above reaches the output start time. In other words, if the current time of the PHC 17A is the PPS signal output start time or after the PPS signal output start time, the current time of the PHC 17A is set back so that the PPS signal generation unit 18A can output the PPS signal.

If the current time of the PHC 17A is before the PPS signal output start time (NO in step S58), the PPS signal control process 24 proceeds to step S41, and then to step S42.

According to the present exemplary embodiment, even if the PPS signal output command designates a PPS signal output start time after the current time of the PHC 17A or 17B that is not in a synchronization state, that configuration allows the start of outputting PPS signals from both of the PPS signal generation units 18A and 18B.

A third exemplary embodiment will be described. A hardware configuration and a functional configuration of the communication apparatus 10, and a configuration of an image communication system according to the third exemplary embodiment are the same as those described in the first exemplary embodiment with reference to FIGS. 1 and 2.

FIG. 9 is a flowchart illustrating an operation performed by the PHC synchronization check process 22 of the communication apparatus 10 that has received a synchronization state inquiry command transmitted by the control apparatus 33, according to the third exemplary embodiment.

In the third exemplary embodiment, in the PHC synchronization check process 22, if not both of the PHCs 17A and 17B is in synchronization with the corresponding time synchronization server of the time synchronization servers 34A and 34B, the current time of the PHC not in a synchronization state is set to the current time of the PHC in a synchronization state or before the current time thereof.

The operation in FIG. 9 starts in response to when the communication I/F unit 16A and/or 16B in the communication apparatus 10 receives a synchronization state inquiry command from the control apparatus 33.

The processing in steps S31 to S36 is the same as that in FIG. 5.

However, in step S32 or S34, if at least one of the PHC 17A or the PHC 17B is in synchronization with the corresponding time synchronization server of the time synchronization servers 34A and 34B (YES in step S32 or S34), the PHC synchronization check process 22 proceeds to step S61. In step S61, the PHC synchronization check process 22 checks which PHC is in a synchronization state.

If both the PHCs 17A and 17B are in synchronization with the time synchronization servers 34A and 34B (both of PHCs 17A and 17B in step S61), respectively, the PHC synchronization check process 22 proceeds to step S36. In step S36, the PHC synchronization check process 22 sends a reply indicating that "the communication apparatus 10 is in a synchronization state" to the control apparatus 33.

In step S61, if the PHC 17A alone is in a synchronization state (PHC 17A in step S61), the PHC synchronization check process 22 proceeds to step S62.

In step S62, the PHC synchronization check process 22 acquires the current times of the PHCs 17A and 17B. In step S63, the PHC synchronization check process 22 compares the current time of the PHC 17A and the current time of the PHC 17B. If the current time of the PHC 17B is ahead of the current time of the PHC 17A (YES in step S63), the PHC synchronization check process 22 proceeds to step S64. In step S64, the PHC synchronization check process 22 sets the current time of the PHC 17B to the current time of the PHC 17A or before the current time of the PHC 17A. If the current time of the PHC 17B is not ahead of the current time of the PHC 17A (NO in step S63), the PHC synchronization check process 22 proceeds to step S36.

In step S61, if the PHC 17B alone is in a synchronization state (PHC 17B in step S61), the PHC synchronization check process 22 proceeds to step S65.

In step S65, the PHC synchronization check process 22 acquires the current times of the PHCs 17A and 17B. Then, in step S66, the PHC synchronization check process 22 compares the current time of the PHC 17B and the current time of the PHC 17A. If the current time of the PHC 17A is ahead of the current time of the PHC 17B (YES in step S66), the PHC synchronization check process 22 proceeds to step S67. In step S67, the PHC synchronization check process 22 sets the current time of the PHC 17A to the current time of the PHC 17B or before the current time of the PHC 17B. If the current time of the PHC 17A is not ahead of the current time of the PHC 17B (NO in step S66), the PHC synchronization check process 22 proceeds to step S36.

As described above, in the PHC synchronization check process 22, if not both the PHC 17A and 17B are in synchronization with the corresponding time synchronization server of the time synchronization servers 34A and 34B, the current time of the PHC that is not in a synchronization state is set to the current time of the PHC in a synchronization state or before the current time thereof. That configuration prevents the current time of the PHC that is not in a synchronization state from being behind the PPS signal output start time designated by the PPS signal output command when the control apparatus 33 transmits a PPS signal output command (step S26 in FIG. 4). As a result, both of the PPS signal generation units 18A and 18B in the communication apparatus 10 that has received the PPS signal output command can output the PPS signals by performing the PPS signal control process 24 (refer to FIG. 6) according to the first exemplary embodiment.

Other Embodiments

While the exemplary embodiments of the present disclosure have been described above, the exemplary embodiments are not intended to limit the present disclosure, and can be modified within the technical scope of the present disclosure in various ways including elimination, addition, and replacement of components.

For example, in the exemplary embodiments described above, the image delivery server system 30 includes the two time synchronization servers 34A and 34B. The time synchronization servers 34A and 34B are connected to the communication I/F units 16A and 16B in each of the communication apparatuses 10a to 10r via the switching hubs 32A and 32B and the cables 25A and 25B, respectively. As a result, even if one of the two time synchronization servers 34A and 34B is in trouble, the PPS signal generation unit corresponding to the other one of the time synchronization servers 34A and 34B outputs and supplies a PPS signal to the camera 28. However, the image delivery server system 30 may have a single time synchronization server connected to the communication I/F units 16A and 16B in each of the communication apparatuses 10a to 10r via the switching hubs 32A and 32B and the cables 25A and 25B, respectively.

In the exemplary embodiments described above, the communication apparatus 10 has the two communication I/F units 16A and 16B, the two PHCs 17A and 17B, and the two PPS signal generation units 18A and 18B. However, the communication apparatus 10 may have three or more communication I/F units, three or more PHCs, and three or more PPS signal generation units, and the image delivery server system 30 may have three or more switching hubs.

In the exemplary embodiments described above, a PPS signal is used as a synchronization signal for a plurality of cameras 28 that captures multi-viewpoint images in the virtual viewpoint image generation system that creates a combined virtual viewpoint content. However, a PPS signal may be used as a synchronization signal for a plurality of cameras 28 in a system that uses images captured by the cameras 28 while switching the images. Further, a PPS signal may be used as a synchronization signal for a plurality of sound recording apparatuses, video recording apparatuses, and other apparatuses.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-124345, filed Jul. 29, 2021, which is hereby incorporated by reference herein in its entirety.

What is claimed is:

1. A communication apparatus, comprising:
a plurality of communication interfaces each connected to a time server;
a plurality of clocks each associated with a corresponding communication interface of the plurality of communication interfaces;
a plurality of output units each associated with a corresponding clock of the plurality of clocks, and each configured to output a synchronization signal using the associated corresponding clock as a reference;
a synchronization unit configured to synchronize the plurality of clocks with the time server;
a check unit configured to check whether the plurality of clocks is in synchronization with the time server; and
a selection unit configured to select as a synchronization signal to be supplied to another apparatus a synchronization signal output from a corresponding output unit of the plurality of output units that is associated with the corresponding clock of the plurality of clocks that is in synchronization with the time server from among the plurality of synchronization signals output from the plurality of output units,
wherein each of the plurality of output units starts outputting the synchronization signal in response to when a time of each of the plurality of clocks reaches a start time designated by an external apparatus, and
wherein each of the plurality of output units outputs the synchronization signal in response to when the time of the corresponding clock of the plurality of clocks reaches the start time, the corresponding clock of the plurality of clocks associated with the corresponding output unit of the plurality of output units being out of synchronization with the time server.

2. The communication apparatus according to claim 1, further comprising:
a comparison unit configured to compare the start time designated by the external apparatus and a current time of the corresponding clock of the plurality of clocks that is out of synchronization with the time server; and
a setting unit configured to set the current time of the corresponding clock of the plurality of clocks that is out of synchronization with the time server to a time before the start time, the current time being the start time or after the start time,
wherein the corresponding output unit of the plurality of output units that is associated with the corresponding clock of the plurality of clocks that is out of synchronization with the time server outputs the synchronization signal in response to when the time of the corresponding clock of the plurality of clocks set to the current time by the setting unit reaches the start time.

3. The communication apparatus according to claim 1, wherein, in response to an inquiry from the external apparatus, the check unit checks whether the plurality of clocks is in synchronization with the time server, and
wherein, in response to when at least one of the plurality of clocks is in synchronization with the time server, the check unit sends to the external apparatus a reply indicating that the communication apparatus is in a synchronization state.

4. The communication apparatus according to claim 1,
wherein, in response to an inquiry from the external apparatus, the check unit checks whether the plurality of clocks is in synchronization with the time server,
wherein, in response to when at least one of the plurality of clocks is in synchronization with the time server, the check unit sends to the external apparatus a reply indicating that the communication apparatus is in a synchronization state, and
wherein a current time of the corresponding clock of the plurality of clocks that is out of synchronization with the time server is set to a current time of the corresponding clock of the plurality of clocks that is in synchronization with the time server or a time before the current time of the corresponding clock of the plurality of clocks that is in synchronization with the time server.

5. A communication system including a plurality of communication apparatuses and a server system configured to communicate with the plurality of communication apparatuses,
each of the plurality of communication apparatuses comprising:
a plurality of communication interfaces each connected to a time server,
a plurality of clocks each associated with a corresponding communication interface of the plurality of communication interfaces;
a plurality of output units each associated with a corresponding clock of the plurality of clocks, and each configured to output a synchronization signal using the associated corresponding clock as a reference;
a synchronization unit configured to synchronize the plurality of clocks with the time server;
a check unit configured to check whether the plurality of clocks is in synchronization with the time server, and
a selection unit configured to select as a synchronization signal to be supplied to another apparatus a synchronization signal output from a corresponding output unit of the plurality of output units that is associated with the corresponding clock of the plurality of clocks that is in synchronization with the time server from among the plurality of synchronization signals output from the plurality of output units,
wherein each of the plurality of output units starts outputting the synchronization signal in response to when a time of each of the plurality of clocks reaches a start time designated by an external apparatus, and
wherein each of the plurality of output units outputs the synchronization signal in response to when the time of the corresponding clock of the plurality of clocks reaches the start time, the corresponding clock of the plurality of clocks associated with the corresponding output unit of the plurality of output units being out of synchronization with the time server, and
the server system comprising:
the time server;
an inquiry unit configured to inquire of the plurality of communication apparatuses whether each of the plurality of communication apparatuses is in synchronization with the time server; and
an instruction unit configured to instruct each of the plurality of communication apparatuses to output a synchronization signal with a start time of outputting the synchronization signal from the corresponding output unit of the plurality of output units designated, the plurality of communication apparatuses being in synchronization with the time server.

6. The server system according to claim 5, further comprising a plurality of time servers in synchronization with one another, each of the plurality of time servers being connected to the corresponding communication interface of the plurality of communication interfaces of each of the plurality of communication apparatuses.

7. A control method for a communication apparatus including a plurality of communication interfaces connected to a time server, a plurality of clocks each associated with a corresponding communication interface of the plurality of communication interfaces, and a plurality of output units each associated with a corresponding clock of the plurality of clocks and each configured to output a synchronization signal using the associated corresponding clock as a reference, the control method comprising:
synchronizing the plurality of clocks with the time server;
checking whether the plurality of clocks is in synchronization with the time server; and
selecting as a synchronization signal to be supplied to another apparatus a synchronization signal output from a corresponding output unit of the plurality of output units that is associated with the corresponding clock of the plurality of clocks that is in synchronization with the timeserver from among the plurality of synchronization signals output from the plurality of output units,
wherein each of the plurality of output units starts outputting the synchronization signal in response to when a time of each of the plurality of clocks reaches a start time designated by an external apparatus, and
wherein each of the plurality of output units outputs the synchronization signal in response to when the time of each of the plurality of clocks reaches the start time, the corresponding clock of the plurality of clocks associated with the corresponding output unit of the plurality of output units being out of synchronization with the time server.

8. A non-transitory computer-readable storage medium storing a program for causing a computer to execute a control method for a communication apparatus including a plurality of communication interfaces connected to a time server, a plurality of clocks each associated with a corresponding interface of the plurality of communication interfaces, and a plurality of output units each associated with a corresponding clock of the plurality of clocks and each configured to output a synchronization signal using the associated corresponding clock as a reference, the method comprising:

synchronizing the plurality of clocks with the time server;

checking whether the plurality of clocks is in synchronization with the time server; and selecting as a synchronization signal to be supplied to another apparatus a synchronization signal output from a corresponding output unit of the plurality of output units that is associated with the corresponding clock of the plurality of clocks that is in synchronization with the time server from among the plurality of synchronization signals output from the plurality of output units, wherein each of the plurality of output units starts outputting the synchronization signal in response to when a time of each of the plurality of clocks reaches a start time designated by an external apparatus, and wherein each of the plurality of output units outputs the synchronization signal in response to when the time of each of the plurality of clocks reaches the start time, the corresponding clock of the plurality of clocks associated with the corresponding output unit of the plurality of output units being out of synchronization with the time server.

* * * * *